United States Patent
Moniz et al.

(10) Patent No.: US 6,739,120 B2
(45) Date of Patent: May 25, 2004

(54) COUNTERROTATABLE BOOSTER COMPRESSOR ASSEMBLY FOR A GAS TURBINE ENGINE

(75) Inventors: Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 10/134,172

(22) Filed: Apr. 29, 2002

(65) Prior Publication Data

US 2003/0200741 A1 Oct. 30, 2003

(51) Int. Cl.[7] .............................. F02C 7/06; F01D 5/30
(52) U.S. Cl. ...................... 60/226.1; 60/268; 60/39.162
(58) Field of Search ............................... 60/226.1, 268, 60/39.162; 416/129, 198 A; 415/68, 69

(56) References Cited

U.S. PATENT DOCUMENTS

| | | | |
|---|---|---|---|
| 3,549,272 A | * 12/1970 | Bauger et al. | 60/226.1 |
| 3,713,748 A | * 1/1973 | Langley | 60/226.1 |
| 3,867,813 A | * 2/1975 | Leibach | 60/226.1 |
| 3,903,690 A | * 9/1975 | Jones | 60/226.1 |
| 4,005,575 A | * 2/1977 | Scott et al. | 60/226.1 |
| 4,751,816 A | 6/1988 | Perry | 60/226.1 |
| 4,790,133 A | 12/1988 | Stuart | 60/226.1 |
| 4,791,783 A | * 12/1988 | Neitzel | 60/262 |
| 4,860,537 A | 8/1989 | Taylor | 60/226.1 |
| 4,976,102 A | 12/1990 | Taylor | 60/226.1 |
| 5,307,622 A | 5/1994 | Ciokajlo et al. | 60/39.162 |
| 5,345,760 A | 9/1994 | Giffin, III | 60/226.1 |
| 5,388,964 A | * 2/1995 | Ciokajlo et al. | 60/226.1 |
| 5,443,590 A | 8/1995 | Ciokajlo et al. | 416/128 |
| 6,158,210 A | 12/2000 | Orlando | 60/226.1 |
| 6,220,012 B1 | 4/2001 | Hauser et al. | 60/39.02 |
| 6,339,927 B1 | 1/2002 | DiPietro, Jr. | 60/226.1 |

* cited by examiner

*Primary Examiner*—Ted Kim
(74) *Attorney, Agent, or Firm*—William Scott Andes; James P. Davidson

(57) ABSTRACT

A counterrotatable booster compressor assembly for a gas turbine engine having a counterrotatable fan section with a first fan blade row connected to a first drive shaft and a second fan blade row axially spaced from the first fan blade row and connected to a second drive shaft, the counterrotatable booster compressor assembly including a first compressor blade row connected to the first drive shaft and a second compressor blade row interdigitated with the first compressor blade row and connected to the second drive shaft. A portion of each fan blade of the second fan blade row extends through a flowpath of the counterrotatable booster compressor so as to function as a compressor blade in the second compressor blade row. The counterrotatable booster compressor further includes a first platform member integral with each fan blade of the second fan blade row at a first location so as to form an inner flowpath for the counterrotatable booster compressor and a second platform member integral with each fan blade of the second fan blade row at a second location so as to form an outer flowpath for the counterrotatable booster compressor.

22 Claims, 5 Drawing Sheets

COUNTERROTATABLE BOOSTER COMPRESSOR ASSEMBLY FOR A GAS TURBINE ENGINE

This invention herein described was made in the performance of work under a NASA contract and is subject to the provisions of section 305 of the National Aeronautics and Space Act of 1958, Public Law 85-568 (72 Stat. 435; 42 U.S.C. 2457).

BACKGROUND OF THE INVENTION

The present invention relates generally to a counterrotatable fan section and counterrotatable booster compressor for a gas turbine engine and, in particular, to a fan blade assembly of a counterrotatable fan section which also functions as a compressor blade in the booster compressor.

Gas turbine engines are continuously being improved so as to achieve greater thrust with lower noise and greater operating efficiency. One approach has become known as the bypass turbofan engine, where the airflow is divided into two separate and concentric flow streams. An outer flow stream is compressed only by a fan section of the engine and is utilized to provide most of the overall thrust, while an inner flow stream passes through the fan, core engine, and turbine to provide power in which to drive the fan. In order to achieve an increase in fan pressure ratio and maintain fan efficiency with lower relative noise, the fan section includes two stages or rows of fan blades which rotate in opposite direction so as to be a counterrotatable fan. For lower noise and greater efficiency, it has become desirable to separate the two rows of fan blades axially to allow attenuation of the wake between them.

To reduce the extra length necessitated by the spacing of the fan blade rows, the inner and outer flow streams are separated at a location axially between such fan stages and the booster compressor positioned within the inner diameter of the second fan stage. Initial configurations of the booster compressor utilized in bypass turbofan engines included various stages of rotor blades which rotated in accordance with the first fan stage, as well as a stator vane stage positioned between each pair of rotor blades (see U.S. Pat. No. 6,220,012 to Hauser et al., for example). Thereafter, as seen in U.S. Pat. No. 4,860,537 to Taylor, U.S. Pat. No. 5,307,622 to Ciokajlo et al., and U.S. Pat. No. 4,790,133 to Stuart, the booster compressor was designed so as to have counterrotatable blade rows or sections therein which rotate in accordance with corresponding stages of the counterrotatable fan.

It has been found that driving the separate blade rows of the booster compressor introduces certain mechanical complexities. In addition, support for the second fan stage is required which does not unduly disrupt sealing of the outer and inner flow streams, particularly since the inner flow stream through the booster compressor must pass through the second fan stage. Thus, in light of the foregoing, it would be desirable for a counterrotatable fan section and counterrotatable booster compressor be developed which simplifies rotation of the second fan stage and the corresponding row of booster compressor blades. It would also be desirable for the disk retaining the second fan stage blades to be located closer to a central axis of the engine to better maintain tip clearances.

BRIEF SUMMARY OF THE INVENTION

In a first exemplary embodiment of the invention, a fan blade assembly for a gas turbine engine having a counterrotatable fan section and a counterrotatable booster compressor is disclosed as including a disk connected to a drive shaft, a fan blade row retained within the disk, a first platform member integral with each fan blade at a first location so as to form an inner flowpath for the counterrotatable booster compressor, and a second platform member integral with each fan blade at a second location so as to form an outer flowpath for the counterrotatable booster compressor, wherein a portion of each fan blade extending between the first and second platform members functions as a compressor blade in a compressor blade row of the counterrotatable booster compressor.

In a second exemplary embodiment of the invention, a counterrotatable booster compressor assembly for a gas turbine engine having a counterrotatable fan section with a first fan blade row connected to a first drive shaft and a second fan blade row axially spaced from the first fan blade row and connected to a second drive shaft is disclosed. The counterrotatable booster compressor assembly includes a first compressor blade row connected to the first drive shaft and a second compressor blade row interdigitated with the first compressor blade row and connected to the second drive shaft, wherein a portion of each fan blade of the second fan blade row extends through a flowpath of the counterrotatable booster compressor so as to function as a compressor blade in the second compressor blade row.

In a third exemplary embodiment of the invention, a gas turbine engine is disclosed as including a high pressure rotor including a high pressure turbine, a low pressure turbine located aft of the high pressure rotor having counterrotating low pressure inner and outer rotors effective for rotating first and second drive shafts, a counterrotatable fan section completely forward of the high pressure rotor including a first fan blade row connected to the first drive shaft and a second fan blade row axially spaced from the first fan blade row and connected to the second drive shaft, and a counterrotatable booster compressor including a first compressor blade row connected to the first drive shaft and a second compressor blade row interdigitated with the first compressor blade row and connected to the second drive shaft, whereby each low pressure turbine rotor respectively drives both a fan blade row and a compressor blade row, wherein a portion of each fan blade of the second fan blade row extends through a flowpath of the counterrotatable booster so as to function as a compressor blade in the second compressor blade row of the counterrotatable booster compressor.

DETAILED DESCRIPTION OF THE INVENTION

Figure 1:
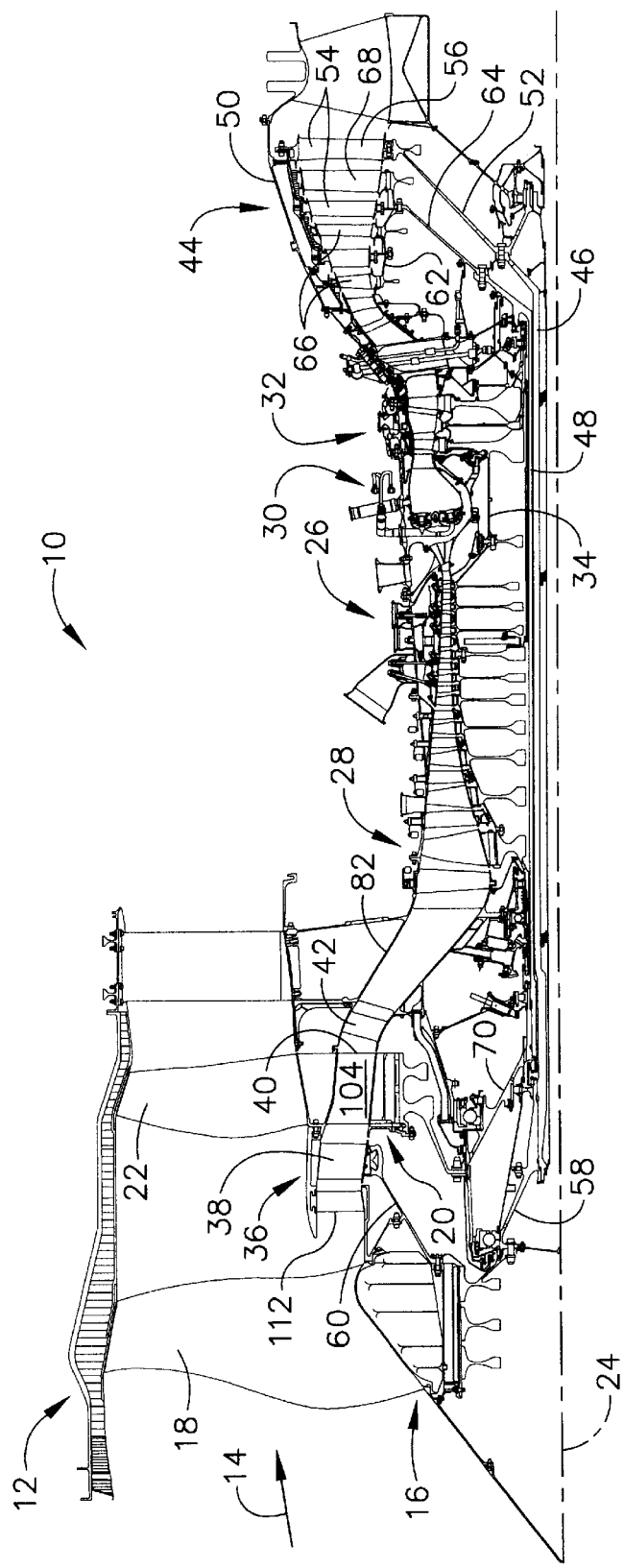
FIG. 1 is a sectional view of a gas turbine engine including a counterrotatable fan section and counterrotatable booster compressor in accordance with the present invention.

Referring now to the drawings in detail, wherein identical numerals indicate the same elements throughout the figures, FIG. 1 depicts an exemplary turbofan gas turbine engine 10 having a fan section 12 which receives an inlet flow of ambient air represented by arrow 14. Fan section 12 preferably includes a first stage 16 having a first row of fan blades 18 and a second stage 20 having a second row of fan blades 22. In the typical bypass turbofan arrangement, first row fan blades 18 will rotate in an opposite direction from, or counter to, the rotation of second row fan blades 22. It will be appreciated that first fan stage 16 and second fan stage 20 preferably are spaced a desired axial distance with respect to a centerline axis 24 extending through gas turbine engine 10 so as to minimize any wake in the air flow therebetween.

A high pressure rotor 26, also known herein as a middle core engine, is positioned downstream of fan section 12, where it will be understood from FIG. 1 that the left side thereof is representative of an upstream side or direction and the right side thereof is representative of a downstream side or direction given the flow of air through gas turbine engine 10. It will be understood that high pressure rotor 26 includes a high pressure compressor 28 which is rotatably driven to compress air entering high pressure rotor 26 to a relatively high pressure, a combustor 30 which mixes fuel with air 14 pressurized by high pressure compressor 28 and ignited to generate combustion gases which flow downstream, and a high pressure turbine 32 which receives the combustion gases and is rotatably driven thereby. High pressure turbine 32, in turn, rotatably drives high pressure compressor 28 via a high pressure drive shaft 34 which interconnects high pressure turbine 32 and high pressure compressor 28. Preferably, high pressure rotor 26 is modular so that as a single unit it can be independently replaced with respect to other parts of gas turbine engine 10.

It will be Seen that a booster compressor 36, which is preferably located upstream of high pressure rotor 26, includes a first row of booster compressor blades 38 and a second row of booster compressor blades 40 interdigitated with first booster compressor blade row 38. Booster compressor 36 is counterrotatable, meaning that first booster compressor blade row 38 rotates in a direction opposite that of second booster compressor blade row 40. Gas turbine engine 10 is preferably designed such that booster compressor blades 40 and fan blades 22 of second fan stage 20 rotate in a direction opposite that of high pressure compressor 28 so as to reduce the sensitivity of gas turbine engine 10 to airflow inlet distortion of fan section 12, as well as reduce mutual sensitivity to rotating stall cells in the other rotors. An outlet guide vane 42 may be provided between second fan stage 20 and high pressure compressor 28 to assist in deswirling the air flow to high pressure compressor 28.

A counterrotatable low pressure turbine 44 positioned downstream of high pressure turbine 32 expands the combustion gases flowing through high pressure turbine 32 and functions to rotatably drive first fan stage 16 and first booster compressor blade row 38 by means of a first or inner low pressure drive shaft 46 and rotatably drive second fan stage 20 and second booster compressor blade row 40 by means of a second or outer low pressure drive shaft 48.

More specifically, low pressure turbine 44 includes an annular outer drum rotor 50 rotatably mounted to first inner low pressure drive shaft 46 by an aft low pressure inner conical extension 52. Outer drum rotor 50 further includes a plurality of first low pressure turbine blade rows 54 extending radially inwardly therefrom and axially spaced from each other. It will be seen that outer drum rotor 50 is cantilevered off of a final stage 56 of low pressure turbine blade rows 54 and is bolted to aft low pressure inner conical shaft extension 52. Low pressure inner drive shaft 46 is then seen to drivingly connect outer drum rotor 50 to first fan stage 16 and first fan blade row 18 by means of a forward conical inner shaft extension 58. First booster compressor blade row 38 is then indirectly driven by low pressure inner drive shaft 46 due to a shaft 60 connecting first fan stage 16 thereto, causing first stage fan blade row 18 and first booster compressor blade row 38 to rotate in the same direction.

Low pressure turbine 44 also includes an annular inner drum rotor 62 which is rotatably mounted to second outer low pressure drive shaft 48 by an aft low pressure outer conical shaft extension 64. Inner drum rotor 62 further includes a plurality of second low pressure turbine blade rows 66 extending radially outwardly therefrom and axially spaced from each other. It will be appreciated that first low pressure turbine blade rows 54 are preferably interdigitated with respect to second low pressure turbine blade rows 66. It will be seen that inner drum rotor 62 is conventionally attached through a final stage 68 of low pressure turbine blade rows 66 and is bolted to aft low pressure outer conical shaft extension 64. Low pressure outer drive shaft 48 is then seen to drivingly connect inner drum rotor 62 to second fan stage 18 and second fan blade row 20 by means of a forward conical outer shaft extension 70. As will be discussed in greater detail herein, second booster compressor blade row 40 is also driven by low pressure outer drive shaft 48, causing second stage fan blade row 20 and second booster compressor blade row 40 to rotate in the same direction, which is counter to the direction of rotation by first fan stage 16 and first booster compressor blade row 38.

Figure 2:
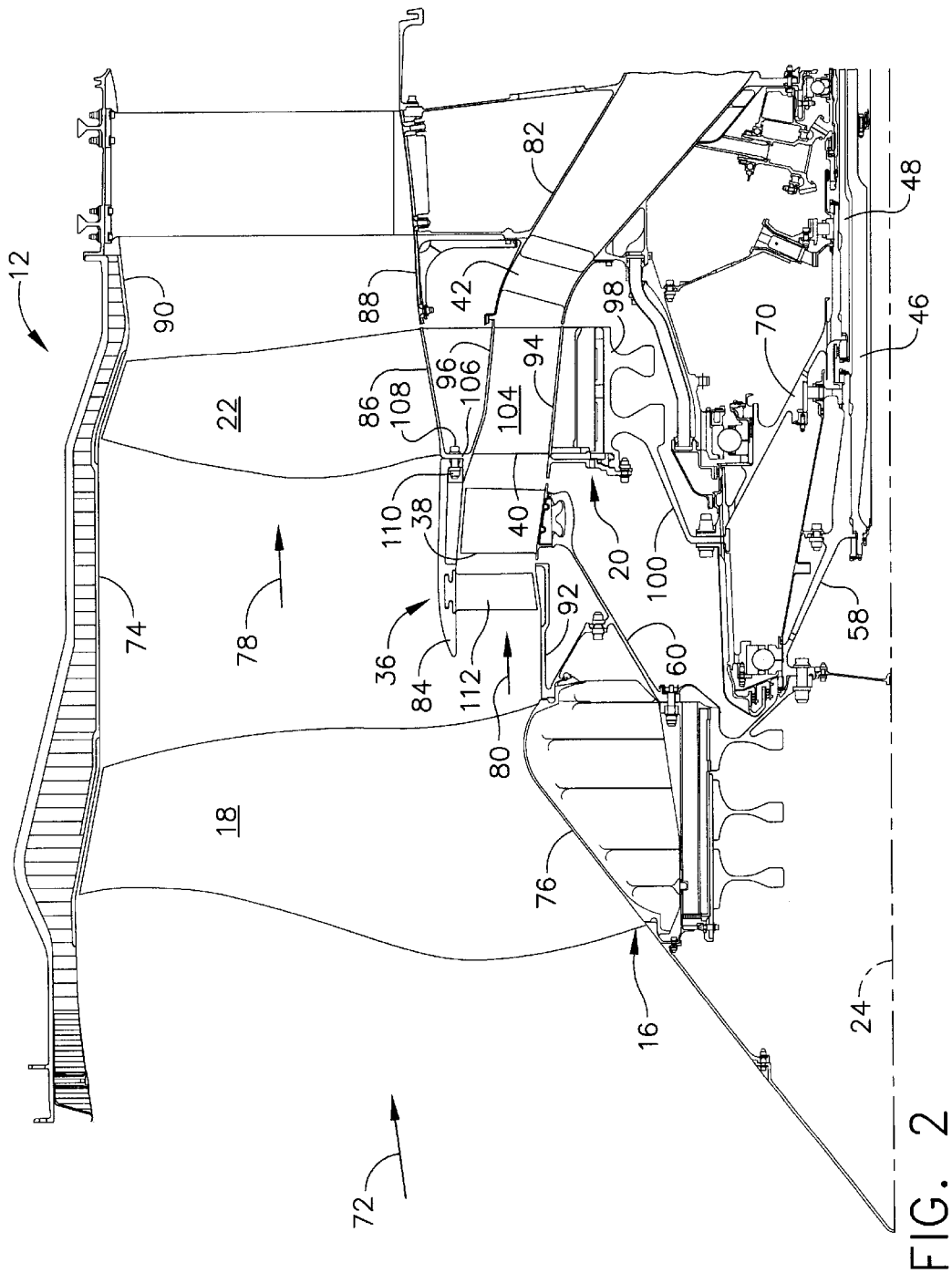
FIG. 2 is an enlarged, partial sectional view of the gas turbine engine depicted in FIG. 1.

A flow path represented by an arrow 72 for fan 12 is defined by a fan casing 74 and a hub 76 for first fan stage 16 (see FIG. 2). It will be seen that flow path 72 is then preferably divided upstream of second fan stage 20, where an outer portion represented by an arrow 78 bypasses the rest of engine 10 (except for passing through second fan stage 20) and an inner portion represented by arrow 80 is directed into booster compressor 36 and an inlet duct 82 to high pressure compressor 28. It will be appreciated that a splitter nose 84 is provided in order to divide flow path 72, which will be discussed in greater detail herein. In association with splitter nose 84, an inner bypass platform member 86 and a wall 88 positioned downstream thereof are provided so as to maintain a bypass duct 90 with fan casing 74 through which outer flow path portion 78 flows. Similarly, a wall 92 is connected to hub 76, and in conjunction with splitter nose 84, a booster inner platform member 94, and a booster outer platform member 96, form inner flow path portion 80 (otherwise known herein as the booster flow path).

Figure 3:
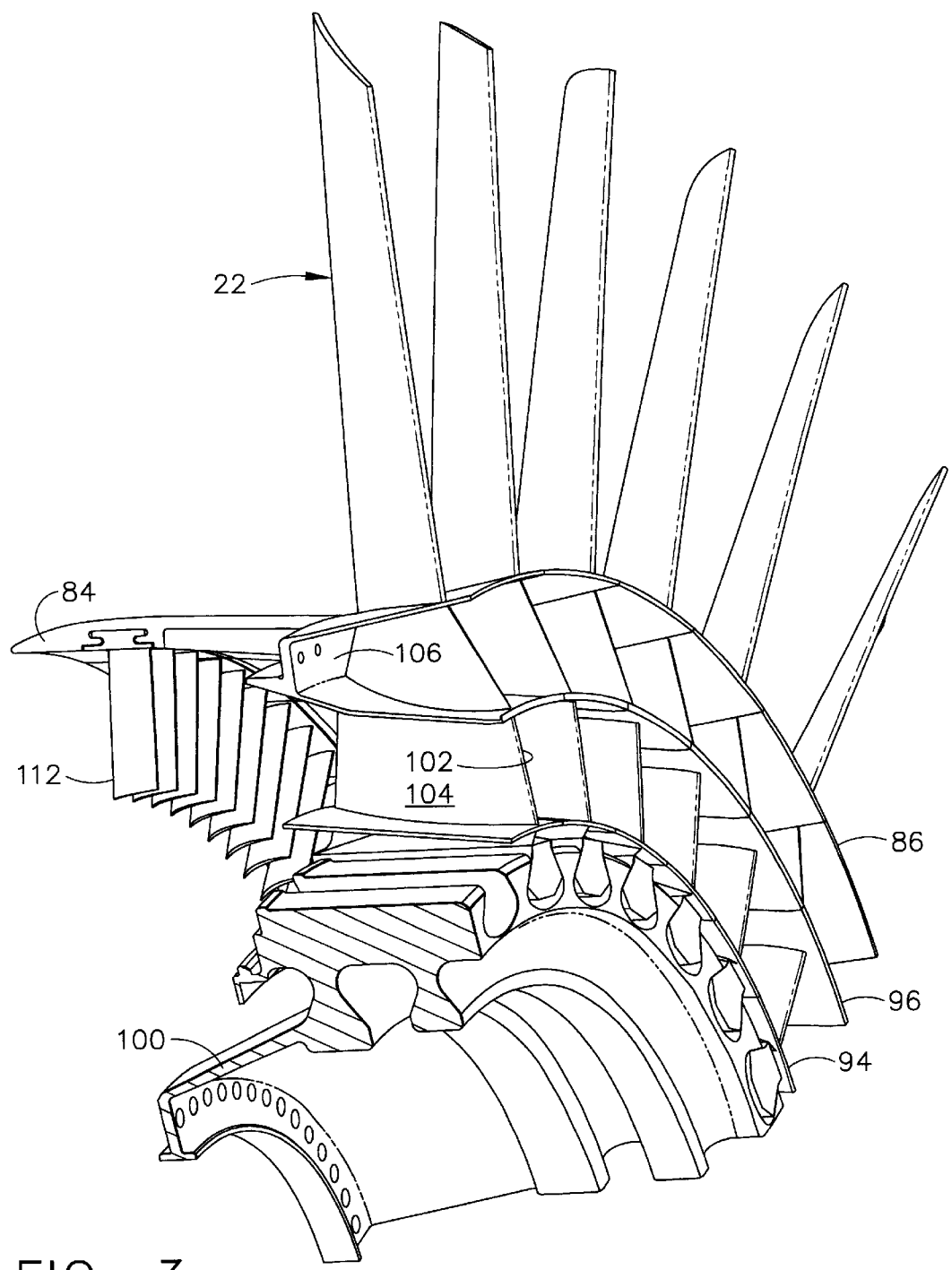
FIG. 3 is a partial perspective view of the second fan stage of the gas turbine engine depicted in FIGS. 1 and 2.
Figures 4, 5:
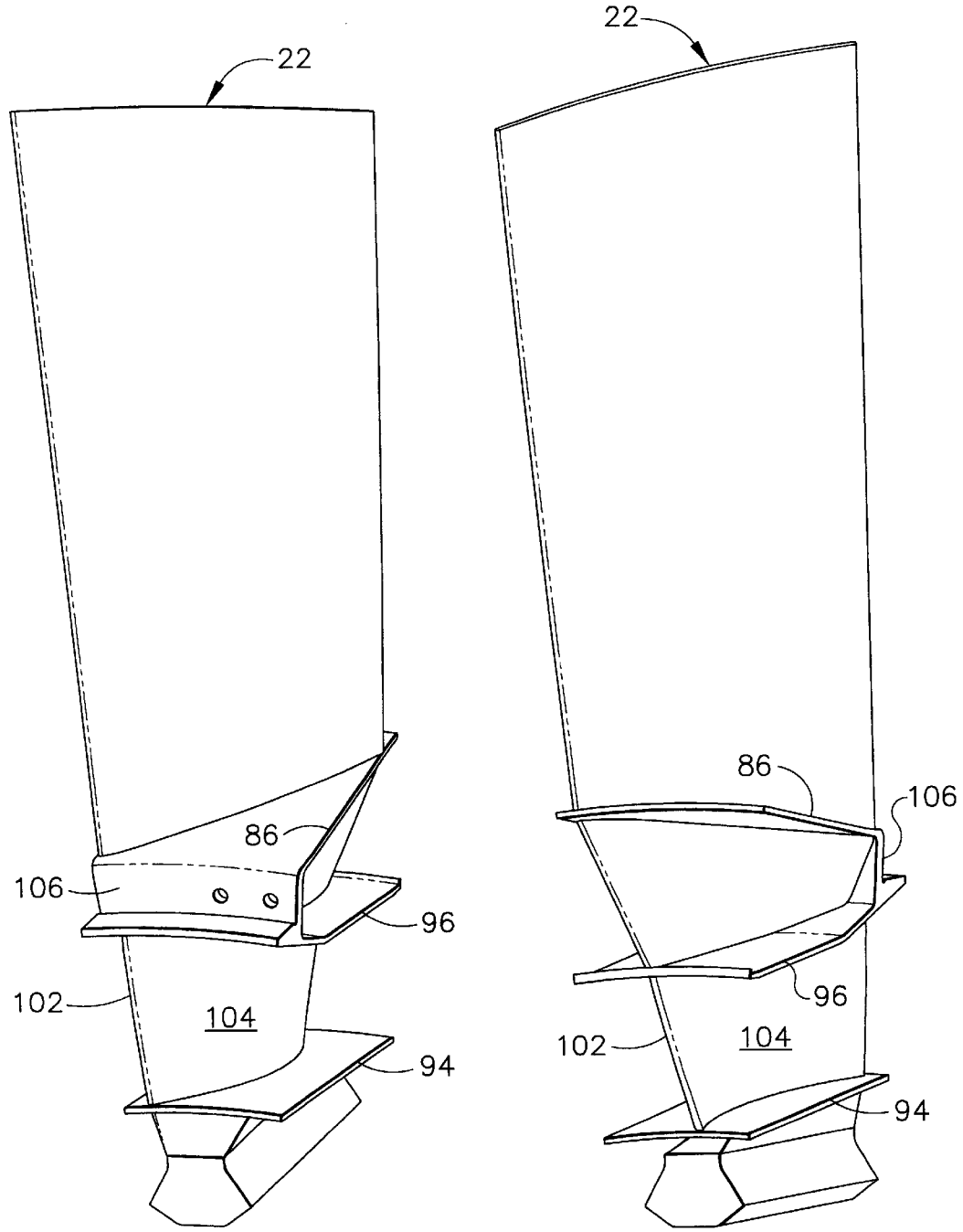
FIG. 4 is a forward looking aft perspective view of a fan blade assembly depicted in FIG. 3.
FIG. 5 is an aft looking forward perspective view of the fan blade assembly depicted in FIGS. 3 and 4; and, FIG. 6 is a partial sectional view of the second fan stage of the gas turbine engine having an alternative configuration in accordance with the invention.

As best seen in FIGS. 2 and 3, second fan stage 18 preferably includes a conventional disk 98 having dovetails therein to retain fan blades 22. Disk 98 is connected to a shaft extension 100, which is in turn connected to forward conical outer shaft extension 70. In this way, disk 98 and fan blades 22 are then driven by low pressure outer drive shaft 48.

In accordance with the present invention, it will be seen that each fan blade 22 preferably includes booster inner platform member 94 integral therewith so as to maintain an inner boundary for booster flow path 80. Booster outer platform member 96 is also preferably integral with each fan blade 22 in order to form an outer boundary of booster flow path 80. In this way, an inner portion 102 of each fan blade 22 which extends between inner and outer booster platform members 94 and 96, respectively, functions as a compressor blade 104 in second booster compressor blade row 40 of booster compressor 36.

It is further seen that each fan blade 22 preferably includes inner bypass platform member 86 integral therewith at a location radially outside of outer booster platform member 96. In order to facilitate connection of splitter nose 84 with outer booster platform member 96 and inner bypass platform member 86, a flange 106 is provided which joins platform members 86 and 96 at an upstream end. Flange 106 is then preferably connected to splitter nose 84 by means of a bolt 108 and swage nut 110. In this way, at least one additional spool or stage for booster compressor 36 may be provided, whereby one or more rows of compressor blades 112 may extend radially inward from splitter nose 84 and rotate in accordance with fan blades 22. Of course, compressor blades 112 are designed so as to interface with wall 92. It will also be understood that such row of compressor blades 112 will be located upstream of first row booster compressor blades 38 so that rotates counter to first stage fan blades 18 and booster compressor blades 38.

Figure 6:
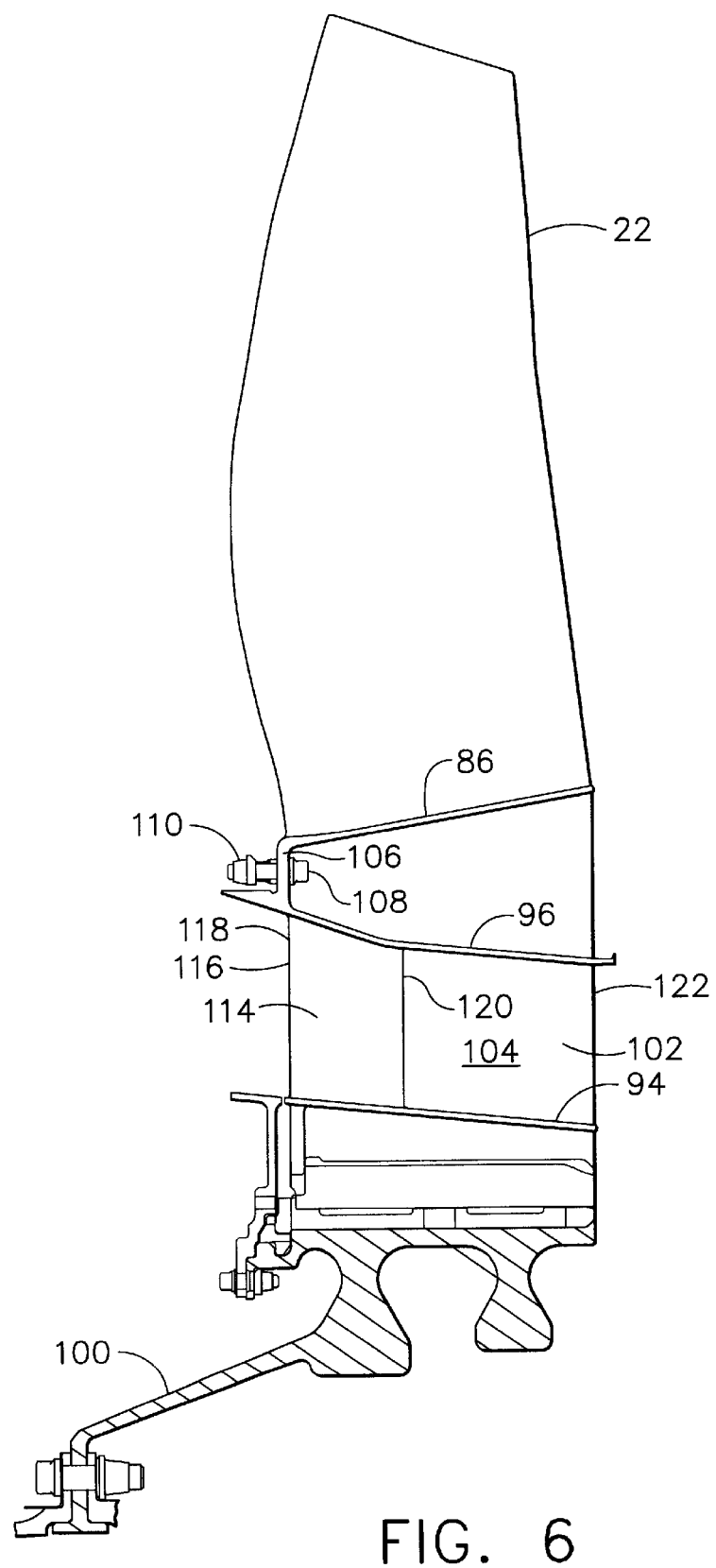

As seen in FIG. 6, it is also contemplated that an additional compressor blade 114 be positioned between inner booster platform member 94 and outer booster platform member 96 adjacent inner fan blade portion 102 of at least certain desired fan blades 22. It will be noted that such compressor blades 114 preferably have a width less than inner fan blade portion 102. Accordingly, when leading edge 116 of compressor blade 114 is positioned substantially in line with a leading edge 118 of inner fan blade portion 102, a trailing edge 120 of compressor blade 114 extends only partially toward trailing edge 122 of inner fan blade portion 102.

Having shown and described the preferred embodiment of the present invention, further adaptations of fan blades 22 and booster compressor 36 can be accomplished by appropriate modifications by one of ordinary skill in the art without departing from the scope of the invention.

What is claimed is:

1. A fan blade assembly for a gas turbine engine having a counterrotatable fan section and a counterrotatable booster compressor, comprising:
   (a) a disk connected to a drive shaft;
   (b) a fan blade row retained within said disk;
   (c) a first platform member integral with each said fan blade at a first location so as to form an inner flowpath for said counterrotatable booster compressor; and
   (d) a second platform member integral with each said fan blade at a second location so as to form an outer flowpath for said counterrotatable booster compressor;
   wherein a portion of each said fan blade extending between said first and second platform members functions as a compressor blade in a compressor blade row of said counterrotatable booster compressor.

2. The fan blade assembly of claim 1, further comprising a third platform member integral with each said fan blade at a third location so as to form an inner flowpath for said counterrotatable fan section.

3. The fan blade assembly of claim 2, said second and third platform members being joined together at an upstream end to form an upstream flange, wherein a booster spool upstream of said fan blade row is connectable to said upstream flange so that all compressor blades extending therefrom rotate in accordance with said fan blade row.

4. The fan blade assembly of claim 1, further comprising an additional booster compressor blade located adjacent to at least some of said fan blades in said fan blade row, said additional booster compressor blades extending between and being connected to said first and second platform members.

5. The fan blade assembly of claim 4, wherein said additional booster compressor blades have a width which is less than a width of said fan blade portions functioning as a compressor blade.

6. The fan blade assembly of claim 5, wherein a leading edge of said additional booster compressor blades is positioned substantially in line with a leading edge for said fan blade portions functioning as a compressor blade.

7. A counterrotatable booster compressor assembly for a gas turbine engine having a counterrotatable fan section with a first fan blade row connected to a first drive shaft and a second fan blade row axially spaced from said first fan blade row and connected to a second drive shaft, said counterrotatable booster compressor assembly comprising:
   (a) a first compressor blade row connected to said first drive shaft; and
   (b) a second compressor blade row interdigitated with said first compressor blade row and connected to said second drive shaft;
   wherein a portion of each fan blade of said second fan blade row extends through a flowpath of said counterrotatable booster compressor so as to function as a compressor blade in said second compressor blade row, each said fan blade of said second fan blade row further comprising:
      (a) a first platform member integral therewith at a first location so as to form an inner flowpath for said counterrotatable booster compressor; and
      (b) a second platform member integral therewith at a second location so as to form an outer flowpath for said counterrotatable booster compressor.

8. The counterrotatable booster compressor assembly of claim 7, further comprising a third platform member integral with each said fan blade of said second fan blade row at a third location so as to form an inner flowpath for said counterrotatable fan section.

9. The counterrotatable booster compressor assembly of claim 8, said second and third platform members being joined together at an upstream end to form an upstream flange.

10. The counterrotatable booster compressor assembly of claim 9, further comprising a booster spool upstream of said second fan blade row connected to said upstream flange, said booster spool including at least one compressor blade extending therefrom which rotates in accordance with said second fan blade row.

11. The counterrotatable booster compressor assembly of claim 7, further comprising an additional booster compressor blade located adjacent to at least some of said fan blades in said second fan blade row, said additional booster compressor blades extending between and connected to said first and second platform members.

12. The counterrotatable booster compressor assembly of claim 7, further comprising an outlet guide vane positioned in said booster flowpath downstream of said second fan blade row.

13. The counterrotatable booster compressor assembly of claim 7, wherein said booster compressor assembly is located between said first and second fan blade rows.

14. The counterrotatable booster compressor assembly of claim 7, further comprising a disk for retaining said second fan blade row, wherein said disk is connected to said second drive shaft.

15. A gas turbine engine, comprising:
   (a) a high pressure rotor including a high pressure turbine;
   (b) a low pressure turbine located aft of said high pressure rotor having counterrotating low pressure inner and outer rotors effective for rotating first and second drive shafts;

(c) a counterrotatable fan section completely forward of said high pressure rotor including a first fan blade row connected to said first drive shaft and a second fan blade row axially spaced from said first fan blade row and connected to said second drive shaft; and (d) a counterrotatable booster compressor including a first compressor blade row connected to said first drive shaft and a second compressor blade row interdigitated with said first compressor blade row and connected to said second drive shaft, whereby each low pressure turbine rotor respectively drives both a fan blade row and a compressor blade row;

wherein a portion of each fan blade of said second fan blade row extends through a flowpath of said counterrotatable booster so as to function as a compressor blade in said second compressor blade row of said counterrotatable booster compressor, each fan blade of said second fan blade row further comprising:

(a) a first platform member integral therewith at a first location so as to form an inner flowpath for said counterrotatable booster compressor; and (b) a second platform member integral therewith at a second location so as to form an outer flowpath for said counterrotatable booster compressor.

16. The gas turbine engine of claim 15, further comprising a third platform member integral with each fan blade of said second fan blade row at a third location so as to form an inner flowpath for said counterrotatable fan section.

17. The gas turbine engine of claim 16, wherein said second and third platform members join together at an upstream end to provide an upstream flange.

18. The gas turbine engine of claim 17, further comprising a booster spool upstream of said second fan blade row having at least one compressor blade of said counterrotatable booster compressor extending Therefrom, wherein said booster spool is connected to said upstream flange so that said compressor blade of said booster spool rotates in accordance with said second fan blade row.

19. The gas turbine engine of claim 15, further comprising an additional booster compressor blade located adjacent to at least some of said second fan blades, said additional booster compressor blades extending between and being connected to said first and second platform members.

20. The gas turbine engine of claim 15, further comprising a fan casing surrounding said counterrotatable fan section so as to form an outer flowpath for said counterrotatable fan section.

21. The gas turbine engine of claim 15, wherein said counterrotatable booster compressor is located between said first fan blade row and said high pressure rotor.

22. The gas turbine engine of claim 15, further comprising a disk for retaining said second fan blade row, said disk being connected to said second drive shaft.

* * * * *

UNITED STATES PATENT AND TRADEMARK OFFICE
CERTIFICATE OF CORRECTION

| | | |
|---|---|---|
| PATENT NO. | : 6,739,120 B2 | Page 1 of 1 |
| APPLICATION NO. | : 10/134172 | |
| DATED | : May 25, 2004 | |
| INVENTOR(S) | : Thomas Ory Moniz et al. | |

It is certified that error appears in the above-identified patent and that said Letters Patent is hereby corrected as shown below:

Col. 7, line 7, delete "Therefrom," and substitute --therefrom,--

Signed and Sealed this

Eighteenth Day of July, 2006

JON W. DUDAS
*Director of the United States Patent and Trademark Office*